(12) United States Patent
Zhao et al.

(10) Patent No.: US 12,495,368 B2
(45) Date of Patent: Dec. 9, 2025

(54) POWER CONTROL METHOD, METHOD AND APPARATUS FOR DETERMINING TRANSMISSION RESOURCES, TERMINAL AND MEDIUM

(71) Applicant: GUANGDONG OPPO MOBILE TELECOMMUNICATIONS CORP., LTD., Guangdong (CN)

(72) Inventors: Zhenshan Zhao, Guangdong (CN); Qianxi Lu, Guangdong (CN); Huei-Ming Lin, South Yarra (AU)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 332 days.

(21) Appl. No.: 17/659,984

(22) Filed: Apr. 20, 2022

(65) Prior Publication Data

US 2022/0248342 A1 Aug. 4, 2022

Related U.S. Application Data

(63) Continuation of application No. PCT/CN2020/109861, filed on Aug. 18, 2020.

(30) Foreign Application Priority Data

Nov. 4, 2019 (WO) ................ PCT/CN2019/115434

(51) Int. Cl.
*H04W 52/32* (2009.01)
*H04L 5/00* (2006.01)
(Continued)

(52) U.S. Cl.
CPC ......... *H04W 52/325* (2013.01); *H04L 5/0051* (2013.01); *H04W 52/242* (2013.01); *H04W 92/18* (2013.01)

(58) Field of Classification Search
CPC . H04W 52/325; H04W 52/242; H04W 92/18; H04W 4/46; H04W 52/383;
(Continued)

(56) References Cited

U.S. PATENT DOCUMENTS 10,211,904 B2 * 2/2019 Hessler ............... H04W 52/242
10,764,844 B2 * 9/2020 Li ........................ H04W 52/286
(Continued)

FOREIGN PATENT DOCUMENTS

CN 102143593 A 8/2011
CN 104735694 A 6/2015
(Continued)

OTHER PUBLICATIONS

Examination report of the European application No. 20886127.8, issued on Feb. 23, 2024. 5 pages.
(Continued)

*Primary Examiner* — Jinsong Hu
*Assistant Examiner* — Rui M Hu
(74) *Attorney, Agent, or Firm* — PERKINS COIE LLP

(57) ABSTRACT

The present application relates to the technical field of communications, and disclosed are a power control method, a method and apparatus for determining transmission resources, a terminal, and a storage medium. The method comprises: acquiring power control configuration information; and according to the power control configuration information, determining whether to perform power control when sending sidelink data. The present application makes all terminals using the same resource pool not perform power control, thereby avoiding the problem in which when a terminal that employs a unicast transmission mode performs power control on a certain resource, a terminal that employs a broadcast transmission mode determines that the
(Continued)

resource is available when listening, thereby preempting the resource and causing a transmission conflict.

8 Claims, 5 Drawing Sheets

(51) Int. Cl.
  *H04W 52/24* (2009.01)
  *H04W 92/18* (2009.01)
(58) Field of Classification Search
  CPC ..... H04W 76/14; H04W 76/40; H04W 52/24; H04W 4/70; H04W 72/02; H04W 72/0473; H04W 72/20; H04W 4/40; H04W 52/241; H04W 52/32; H04W 52/38; H04L 5/0051
  See application file for complete search history.

(56) References Cited

U.S. PATENT DOCUMENTS

| | | | | |
|---|---|---|---|---|
| 11,570,726 | B2* | 1/2023 | Wu | H04L 5/0051 |
| 2020/0228247 | A1* | 7/2020 | Guo | H04L 1/0025 |
| 2020/0260386 | A1* | 8/2020 | Ryu | H04W 76/14 |
| 2020/0313801 | A1* | 10/2020 | Chae | H04L 1/1854 |
| 2020/0314770 | A1* | 10/2020 | Wu | H04W 52/367 |
| 2020/0413348 | A1* | 12/2020 | Ryu | H04W 52/241 |
| 2021/0022091 | A1* | 1/2021 | Li | H04W 52/242 |
| 2021/0045062 | A1* | 2/2021 | Ryu | H04W 24/10 |
| 2021/0051594 | A1* | 2/2021 | Chae | H04L 5/0055 |
| 2021/0051602 | A1* | 2/2021 | Bai | H04W 52/241 |
| 2021/0250118 | A1* | 8/2021 | Roth-Mandutz | H04W 76/14 |
| 2021/0266110 | A1* | 8/2021 | Wang | H04W 72/0446 |
| 2021/0385751 | A1* | 12/2021 | Lee | H04W 52/10 |
| 2021/0410084 | A1* | 12/2021 | Li | H04W 52/265 |
| 2022/0039021 | A1* | 2/2022 | Ryu | H04W 52/383 |
| 2022/0061079 | A1* | 2/2022 | Lee | H04W 24/08 |
| 2022/0086768 | A1* | 3/2022 | Yeo | H04W 52/383 |
| 2022/0110067 | A1* | 4/2022 | Ryu | H04L 5/0051 |
| 2022/0159583 | A1* | 5/2022 | Wang | H04W 52/242 |
| 2022/0210747 | A1* | 6/2022 | Lee | H04W 92/18 |
| 2022/0217649 | A1* | 7/2022 | Lee | H04W 52/242 |
| 2022/0217655 | A1* | 7/2022 | Lee | H04W 52/343 |
| 2022/0225243 | A1* | 7/2022 | Claeson | H04W 52/327 |
| 2022/0232532 | A1* | 7/2022 | Wu | H04W 74/0808 |
| 2022/0248346 | A1* | 8/2022 | Yang | H04W 52/367 |
| 2022/0255643 | A1* | 8/2022 | Zhao | H04B 17/318 |
| 2022/0264476 | A1* | 8/2022 | Kim | H04W 92/18 |
| 2022/0286977 | A1* | 9/2022 | Yang | H04W 52/24 |
| 2022/0303909 | A1* | 9/2022 | Kwon | H04W 16/28 |
| 2022/0330038 | A1* | 10/2022 | Ganesan | H04W 8/005 |
| 2022/0346038 | A1* | 10/2022 | Miao | H04W 52/245 |
| 2022/0361111 | A1* | 11/2022 | Lee | H04W 72/02 |
| 2022/0417867 | A1* | 12/2022 | Yoshioka | H04W 52/10 |
| 2023/0109359 | A1* | 4/2023 | Back | H04L 27/34 370/329 |

FOREIGN PATENT DOCUMENTS

| | | |
|---|---|---|
| CN | 104904279 A | 9/2015 |
| CN | 105940744 A | 9/2016 |
| CN | 108401535 A | 8/2018 |
| CN | 108702244 A | 10/2018 |
| CN | 109257810 A | 1/2019 |
| CN | 109644434 A | 4/2019 |
| CN | 109644436 A | 4/2019 |
| CN | 110178389 A | 8/2019 |
| CN | 110602776 A | 12/2019 |
| EP | 2747494 A1 | 6/2014 |
| EP | 3407657 A1 | 11/2018 |
| WO | 2016060177 A1 | 4/2016 |
| WO | 2019159568 A1 | 8/2019 |

OTHER PUBLICATIONS

3GPP "UE procedures related to Sidelink" Technical Specification 36.213 V15.7.0; Release 15; 2019; 57 pages.
Examination Report for European Application No. 20886127.8 issued Mar. 14, 2023. 7 pages.
Examiner's Report for Canadian Application No. 3155949 issued Jun. 1, 2023. 4 pages.
First Office Action for Chinese Application No. 202210345099.3 issued May 24, 2023. 14 pages with English translation.
Second Office Action of the Chinese application No. 202210345099.3, issued on Jul. 25, 2023. 18 pages with English translation.
Examination Report of the European application No. 20886127.8, issued on Sep. 8, 2023. 7 pages.
Third Office Action of the Chinese application No. 2022103450993, issued on Oct. 25, 2023. 17 pages with English translation.
Basic principles and key technologies of LTE, First version, issued on May 31, 2010. 17 pages with English translation.
Anas, M. et al. "Performance Analysis of Handover Measurements and Layer 3 Filtering for UTRAN LTE" 18th Annual IEEE PIMRC; 2007. 5 pages.
Examination Report for Indian Application No. 202227029845 issued Oct. 17, 2022. 6 pages with English translation.
Extended European Search Report for European Application No. 20886127.8 issued Oct. 10, 2022. 12 pages.
Huawei et al. "Transmit diversity solutions for R15 sidelink" R1-1707003; 3GPP TSG RAN WG1 Meeting #89; Hangzhou, China; May 15-19, 2017. 5 pages.
LG Electronics "Feature lead summary for AI 7.2.4.5 Physical layer procedures for sidelink" R1-1910874; 3GPP TSG RAN WG1 #98bis; Congqing, China; Oct. 14-20, 2019. 37 pages.
NTT Docomo, Inc. "Sidelink physical layer procedure for NR V2X" R1-1911173; 3GPP TSG RAN WG1 #98bis; Chongqing, China; Oct. 14-20, 2019. 17 pages.
Samsung "Considerations on Sidelink Power Control" R1-1902286; 3GPP TSG RAN WG1 #96; Athens, Greece; Feb. 25-Mar. 1, 2019. 7 pages.
3GPP TS 36.213 V15.7.0 (Sep. 2019)—Release 15—14 UE procedures related to Sidelink (pp. 477-533).
3GPP TSG RAN WG 1 Meeting 100 e—R1-2001012—e-Meeting, Feb. 24 Mar. 6, 2020—Ericsson, Physical layer procedures for NR sidelink (7 pags).
3GPP TSG RAN WG1 #100—R1-2000492—e-Meeting, Feb. 24-Mar. 6, 2020—OPPO, Remaining issues of physical layer procedure for NR-V2X (11 pages).
3GPP TSG RAN WG1 #100 Meeting—R1-2000321—e-Meeting, Feb. 24-Mar. 6, 2020—vivo, Remaining issues on physical layer procedure for NR sidelink (17 pages).
3GPP TSG RAN WG1 #100-e—R1-2000621—e-Meeting, Feb. 24-Mar. 6, 2020—Samsung, On Physical layer procedure for NR sidelink (12 pages).
3GPP TSG RAN WG1 #97—R1-1906950—Reno, USA, May 13-17, 2019—Samsung, On Sidelink Power Control (8 pages).
3GPP TSG RAN WG1 #98—R1-1909923—Prague, CZ, Aug. 26-30, 2019—LG Electronics, High layer parameters in WI 5G V2X with NR sidelink (3 pages).
3GPP TSG RAN WG1 Meeting #100 e—R1 2000187—Feb. 24 Mar. 6, 2020—Huawei, HiSilicon, Remaining details of physical layer procedures for sidelink (23 pages).
3GPP TSG RAN WG1 Meeting #97—R1 1906598—Reno, USA, May 13 17, 2019—Huawei, HiSilicon, Power control and power sharing for V2X sidelink (6 pages).
3GPP TSG RAN WG1 Meeting #98—R1-1907973—Prague, Czech Rep, Aug. 26-30, 2019—MCC Support, Final Report of 3GPP TSG RAN WG1 #97 v1.0.0 (Reno, USA, May 13-17, 2019) (192 pages).
3GPP TSG RAN WG1 Meeting 100—R1-2000785—e-Meeting, Feb. 24 Mar. 6, 2020—LG Electronics, Discussion on physical layer procedures for NR sidelink (21 pages).
3GPP TSG-RAN2 Meeting #106—R2-1906544—Reno, USA, May 13-17, 2019—Resubmission of R2-1903703—ASUSTeK, Resource pool selection for Mode 2 (3 pages).
International Search Report issued Nov. 20, 2020 of PCT/CN2020/109861 (6 pages).

(56) References Cited

OTHER PUBLICATIONS

International Search Report issued Jul. 27, 2020 of PCT/CN2019/115434 (6 pages).
3GPP TSG RAN WG1 Meeting #97—R1 1906008—Reno, USA, May 13 17, 2019—Huawei, HiSilicon, Sidelink physical layer procedures for NR V2X (24 pages).
3GPP TSG RAN WG1 Meeting #98 bis—R1-1910783—Chongqing, China, Oct. 14 20, 2019—LG Electronics, Discussion on physical layer procedures for NR sidelink (23 pages).
3GPP TSG RAN WG1 #98bis—R1-1911070—Chongqing, China, Oct. 14-20, 2019—MediaTek Inc., Physical layer procedures for sidelink (16 pages).
First Office Action of the Japanese application No. 2022-524281, issued on Jun. 25, 2024. 9 pages with English translation.
Examination Report of the European application No. 20886127.8, issued on Aug. 26, 2024. 5 pages.
Samsung, "On Physical Layer Procedures for NR V2X". R1-1908481, 3GPP TSG RAN WG1 #98, Prague, CZ, Aug. 26-30, 2019. 20 pages.
Anonymous: 3GPP TS 36.331 V15.7.0 (Sep. 2019),"3rd Generation Partnership Project; Technical Specification Group Radio Access Network; Evolved Universal Terrestrial Radio Access (EUTRA); Radio Resource Control (RRC); Protocol specification (Release 15)", Sep. 27, 2019 (Sep. 27, 2019) , 959 pages.
Zhou Shudao et al. "Modern Weather Radar", National Defense Industry Press. Dec. 2017. 12 pages with English translation.
Xue Xiaoping et al. "Broadband wireless communications", Tongji University Press. Oct. 2016. 12 pages with English translation.
Hakima Chaouchi, "The Internet of Things—Connecting Objects to the Web", National Defense Industry Press. May 2011. 15 pages with English translation.
Xu Ning, "Air interface evolution of cellular mobile communication systems—LTE, LTE-A, LTE Pro and 5G", Beijing University of Posts and Telecommunications Press. Oct. 2017. 14 pages with English translation.
Second Office Action of the Japanese application No. 2022-524281, issued on Dec. 13, 2024. 7 pages with English translation.
Vivo, Discussion on mode 2 resource allocation mechanism, 3GPP TSG RAN WG1 #98bis R1-1911420, Oct. 14-20, 2019. 14 pages.
Huawei, HiSilicon, Antenna aspects for NR V2X, 3GPP TSG RAN WG1 #97 R1-1906600, May 13-17, 2019. 3 pages.
Hearing Notice of the Indian application No. 202227029845, issued on Feb. 25, 2025. 3 pages.
First Office Action of the Korean application No. 10-2022-7013966, issued on May 29, 2025, 10 pages with English translation.
First Office Action of the Indonesia application No. P00202205824, issued on Jun. 2, 2025, 5 pages with English translation.

\* cited by examiner

POWER CONTROL METHOD, METHOD AND APPARATUS FOR DETERMINING TRANSMISSION RESOURCES, TERMINAL AND MEDIUM

CROSS-REFERENCE TO RELATED APPLICATIONS

The present application is a continuation application of International PCT Application No. PCT/CN2020/109861, filed on Aug. 18, 2020, which claims the priority of the PCT application with the application number PCT/CN2019/115434, filed on Nov. 4, 2019 and entitled "Power Control Method, Transmission Resource Determination Method, Device, Terminal, and Medium". The above-identified applications are incorporated in the present application by reference in their entireties.

TECHNICAL FIELD

The present application relates to the field of mobile communication, in particular to a power control method and apparatus, a method and apparatus for determining a transmission resource, a terminal, and a medium.

BACKGROUND

A Vehicle to Everything system supports Device to Device (D2D) communication. Two terminals may communicate directly through a SideLink (SL). The Vehicle to Everything system currently supports three transmission modes, i.e., unicast, multicast, and broadcast.

For the broadcast transmission mode, in order to allow more receiver terminals to receive data, a sending side terminal will send data using a maximum sending power. However, for the unicast or multicast transmission mode, since a receiver terminal is one terminal or a group of terminals, a sending side terminal may adjust its own sending power according to channel quality of a sidelink so as to achieve a purpose of energy saving.

In a process of use, since a terminal using the unicast or multicast transmission mode has a relatively small sending power when sending sidelink data on a resource, a terminal using the broadcast transmission mode may make a mistake in listening and occupy the resource, resulting in a transmission conflict. Therefore, how to perform reasonable power control in a Vehicle to Everything system is a technical problem to be solved urgently.

SUMMARY

Embodiments of the present application provide a power control method and apparatus, a method and apparatus for determining a transmission resource, a terminal, and a medium, which may be used for solving the problem of how to perform reasonable power control in the Vehicle to Everything system. Technical solutions are as follows.

According to one aspect of the present application, a power control method is provided, which is applied to a first terminal, the method including: acquiring power control configuration information; and determining, according to the power control configuration information, whether to perform power control when sending sidelink data.

According to another aspect of the present application, a power control method is provided, which is applied to a network side device or a second terminal, the method including: generating power control configuration information, the power control configuration information being used for indicating whether a first terminal performs power control when sidelink data is sent; and sending the power control configuration information.

According to another aspect of the present application, a method for determining a transmission resource is provided, which is applied to a first terminal, the method including: acquiring a first Reference Signal Received Power (RSRP) threshold and a second RSRP threshold; and using, when determining a candidate transmission resource for D2D, the first RSRP threshold or the second RSRP threshold to determine whether the transmission resource is an available candidate transmission resource.

According to another aspect of the present application, a method for determining a transmission resource is provided, which is applied to a network side device, the method including: sending a first RSRP threshold and a second RSRP threshold to a terminal, the terminal being configured to use, when determining a candidate transmission resource for Device to Device (D2D), the first RSRP threshold or the second RSRP threshold to determine whether the transmission resource is an available candidate transmission resource.

According to another aspect of the present application, a power control apparatus is provided, the apparatus including: an acquiring module configured to acquire power control configuration information; and a determining module configured to determine, according to the power control configuration information, whether to perform power control when sidelink data is sent.

According to another aspect of the present application, a power control apparatus is provided, the apparatus including: a generating module configured to generate power control configuration information, the power control configuration information being used for indicating whether a first terminal performs power control when sidelink data is sent; and a sending module configured to send the power control configuration information.

According to another aspect of the present application, an apparatus for determining a transmission resource is provided, which is applied to a first terminal, the apparatus including: an acquiring module configured to acquire a first RSRP threshold and a second RSRP threshold; and a processing module configured to use, when determining a candidate transmission resource for D2D, the first RSRP threshold or the second RSRP threshold to determine whether the transmission resource is an available candidate transmission resource.

According to another aspect of the present application, an apparatus for determining a transmission resource is provided, the apparatus including: a sending module configured to send a first RSRP threshold and a second RSRP threshold to a terminal, the terminal being configured to use, when determining a candidate transmission resource for Device to Device (D2D), the first RSRP threshold or the second RSRP threshold to determine whether the transmission resource is an available candidate transmission resource.

According to another aspect of the present application, a terminal is provided, the terminal including: a processor; a transceiver connected to the processor; and a memory for storing executable instructions of the processor, wherein the processor is configured to load and execute the executable instructions to implement the above power control method or the above method for determining a transmission resource.

According to another aspect of the present application, a network side device is provided, the network side device including: a processor; a transceiver connected to the processor; and a memory for storing executable instructions of the processor, wherein the processor is configured to load and execute the executable instructions to implement the above power control method or the above method for determining a transmission resource.

According to another aspect of the present application, a computer-readable storage medium is provided, which stores executable instructions that are loaded and executed by a processor to implement the above power control method.

The technical solutions according to the embodiments of the present application at least include the following beneficial effects.

Power control configuration information is used for indicating that a first terminal does not need to perform power control, so that a terminal using a resource pool (or resources) does not need to perform power control (i.e., neither performs power control according to a sidelink path loss, nor performs power control according to a downlink path loss) when sending sidelink data, and the first terminal may send sidelink data using a maximum sending power. Therefore, all terminals using a same resource pool do not perform power control, thus avoiding a problem that when a terminal adopting a unicast transmission mode performs power control on a resource, a terminal adopting a broadcast transmission mode determines, when listening, that the resource is available and thus preempts the resource, causing a transmission conflict.

BRIEF DESCRIPTION OF DRAWINGS

In order to describe the technical solutions in the embodiments of the present application more clearly, drawings that need to be used in the description of the embodiments will be briefly introduced below. It is apparent that the drawings described below are only some embodiments of the present application, and for those of ordinary skills in the art, other drawings may be obtained according to these drawings without paying an inventive effort.

DETAILED DESCRIPTION

To make objects, the technical solutions, and advantages of the present application clearer, implementation modes of the present application will be described in further detail below with reference to the accompanying drawings.

First, a brief description is made on several technical terms involved in the present application.

D2D/V2X

Vehicle to Everything (V2X) is a Sidelink (SL) transmission technology based on D2D communication. Different from a conventional cellular system in which communication data is received or sent through a base station, a Vehicle to Everything system employs a mode of terminal-to-terminal direct communication, and therefore has a higher spectrum efficiency and a lower transmission delay. Two transmission modes are defined in the 3rd Generation Partnership Project (3GPP), i.e., mode A and mode B.

Figure 1:
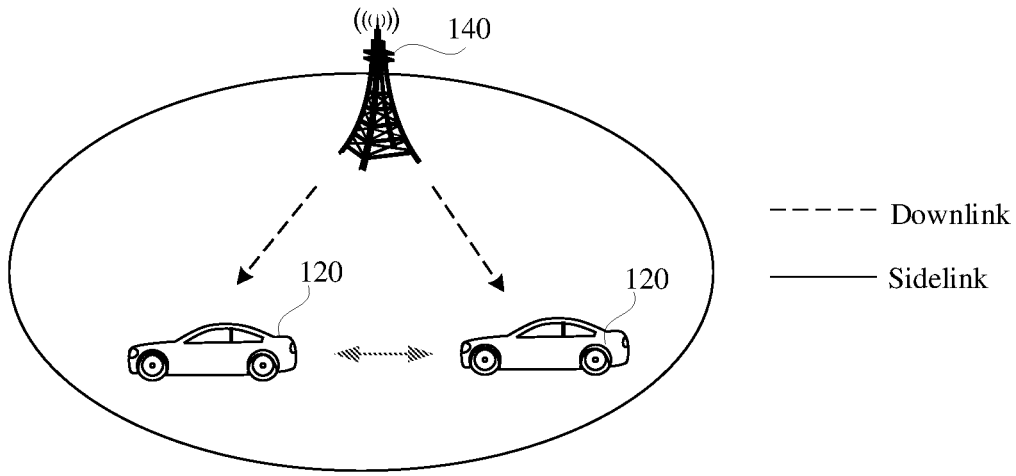
FIG. 1 is a block diagram of a Vehicle to Everything system according to an exemplary embodiment of the present application.

In mode A, a transmission resource of a terminal 120 is allocated by a base station 140 through a downlink, and the terminal 120 sends data on a sidelink according to the transmission resource allocated by the base station 140; and the base station 140 may allocate a transmission resource for single transmission to the terminal 120, and may also allocate a transmission resource for semi-static transmission to the terminal 120, as shown in FIG. 1.

In mode B, a terminal 120 selects one resource from a resource pool for data transmission. Specifically, the terminal 120 may select a transmission resource from the resource pool by means of listening, or select a transmission resource from the resource pool by means of random selection.

V2X Transmission Resource Selection

Figure 2:
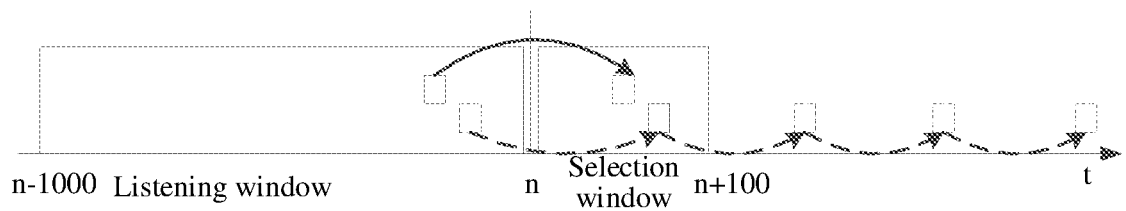
FIG. 2 is a schematic diagram of a principle of listening to a Vehicle to Everything resource according to an exemplary embodiment of the present application.

When a new data packet arrives at a point n in time and resource selection is required, a terminal will select a resource within [n+T1, n+T2] milliseconds according to a listening result during past 1 second, wherein T1<=4 milliseconds; 20 milliseconds<=T2<=100 milliseconds, as shown in FIG. 2.

When the terminal selects a resource in a selection window, the terminal puts all resources in the resource selection window in a set A as candidate transmission resources, and performs exclusion on elements in the set A according to the listening result. A specific exclusion process is as follows.

1. If the terminal does not have a listening result for some subframes in a listening window, resources on subframes corresponding to these subframes in the selection window are excluded.

2. If the terminal detects a Physical Sidelink Control Channel (PSCCH) in the listening window, a Reference Signal Received Power (RSRP) of a Physical Sidelink Shared Channel (PSSCH) scheduled by the PSCCH is higher than a threshold, and a reserved transmission resource determined according to reservation information in control information has a resource conflict with data to be sent by a user, the user excludes the resource from the set A.
3. If a quantity of remaining resources in the set A is smaller than 20% of a total number of resources, the terminal will raise the threshold of the PSSCH-RSRP by 3 dB and repeats acts 1 and 2 until the quantity of remaining resources in the set A is greater than 20% of the total number of resources.
4. The terminal performs a Sidelink Received Signal Strength Indicator (S-RSSI) detection on the remaining resources in the set A, and sorts the remaining resources according to energy from high to low, and puts 20% (relative to a quantity of resources in the set A) of resources with a lowest energy into a set B.
5. The terminal selects a resource from the set B with equal probability for data transmission.

Sidelink Feedback Channel

Figure 3:
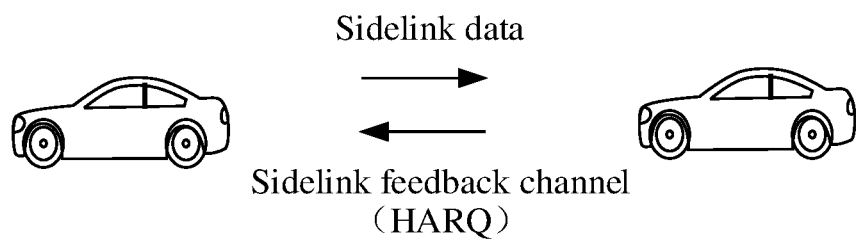
FIG. 3 is a schematic diagram of a sidelink feedback channel according to an exemplary embodiment of the present application.

In order to improve reliability, a sidelink feedback channel is introduced to V2X. For example, for unicast transmission, a sender terminal sends sidelink data (including a Physical Sidelink Control Channel (PSCCH) and a Physical Sidelink Shared Channel (PSSCH)) to a receiver terminal, the receiver terminal sends a Hybrid Automatic Repeat reQuest (HARQ) feedback information to the sender terminal, and the sender terminal determines whether retransmission is needed according to the feedback information of the receiver terminal. The HARQ feedback information is carried in a Physical Sidelink Feedback Channel (PSFCH), as shown in FIG. 3.

Power Control

For the broadcast transmission mode, in order to allow more terminals to receive data, a sender terminal usually sends data using a maximum sending power. However, for the unicast or multicast transmission, a receiver terminal is one terminal or a group of terminals. Therefore, the sender terminal may adjust a sending power according to a status of a sidelink, so as to save energy and also reduce interference with other transmission links. In New Radio (NR)-V2X, a receiver terminal performs measurement according to a sidelink reference signal sent by a sender terminal, for example, an RSRP of a reference signal is measured, the RSRP is fed back to a sending side, a sidelink path loss is estimated at the sending side, and a sending power is adjusted according to the sidelink path loss. Or, a receiver terminal measures a sidelink reference signal, estimates a sidelink path loss, and feeds back the sidelink path loss to a sender terminal, and the sender terminal performs power control according to the sidelink path loss.

Figure 4:
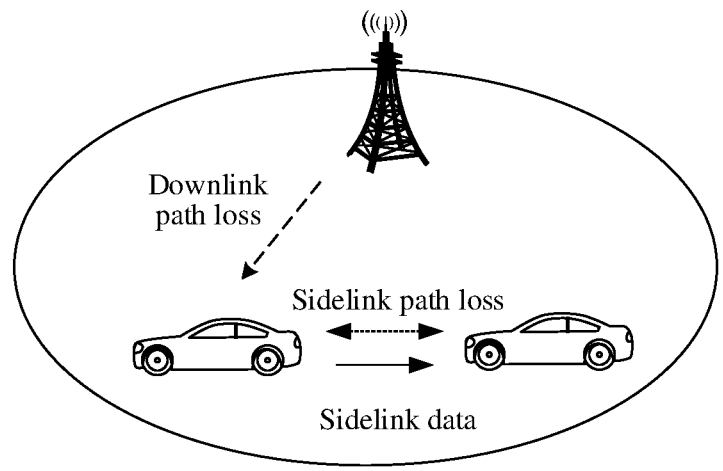
FIG. 4 is a schematic diagram of a power control method according to an exemplary embodiment of the present application.

Further, when a terminal is in a cell range, and when a same carrier is used for sidelink transmission and uplink transmission, in order to avoid interference from sidelink data transmission to uplink data transmission, the terminal needs to perform power control according to a downlink path loss, as shown in FIG. 4. The terminal performs measurement according to a downlink reference signal to obtain the downlink path loss, and determines a sending power according to the downlink path loss.

Figure 5:
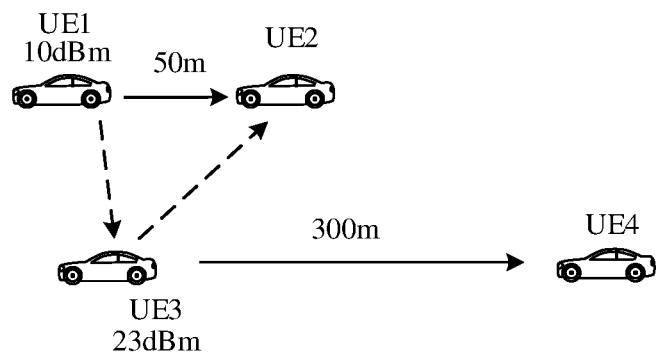
FIG. 5 is a schematic diagram of a scenario where a broadcast terminal interferes with a unicast terminal according to an exemplary embodiment of the present application.

After introduction of power control, if a sending power of a terminal using the unicast transmission mode is reduced, listening processes of other terminals will be affected adversely. As shown in FIG. 5, UE1 and UE2 perform unicast communication, and UE3 is a broadcast user. When UE1 and UE2 perform unicast communication, power control is performed, and since UE1 and UE2 are very close to each other, a sending power of UE1 will be very low, e.g., 10 dBm. When UE3 performs listening, since the sending power of UE1 is low, a PSSCH-RSRP of UE1 measured by UE3 is very low, and UE3 will consider that interference on a transmission resource used by UE1 is very low, and therefore will believe that the transmission resource is an available resource. If UE3 selects the transmission resource and performs broadcast transmission, in order to ensure that data of UE3 can be received by more users, such as UE4, UE3 usually uses a maximum power (e.g., 23 dBm) for sending, so a signal of UE3 interferes with receiving of UE2, resulting in UE2's failure to receive data of UE1.

The above terminals may include various handheld devices, vehicle-mounted devices, wearable devices, computing devices with wireless communication functions, or other processing devices connected to a wireless modem, and various types of User Equipment (UEs), Mobile Stations (MSs), terminal devices, and the like. For convenience of description, the above-mentioned devices are collectively referred to as terminals or UEs.

Figure 6:
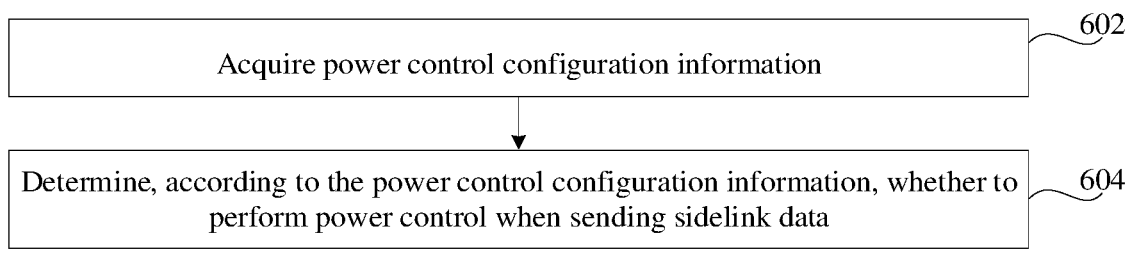
FIG. 6 is a flowchart of a power control method according to an exemplary embodiment of the present application.

FIG. 6 is a flowchart of a power control method according to an exemplary embodiment of the present application. In this embodiment, description is made by taking a case where the method is performed by a first terminal as an example. The method includes act 602 and act 604.

In act 602, power control configuration information is acquired.

Optionally, the first terminal acquires preconfigured power control configuration information. Or, the first terminal receives power control configuration information sent by a network side device. Or, the first terminal receives power control configuration information sent by a second terminal.

Optionally, the power control configuration information is carried in resource pool (or sidelink transmission resource pool, D2D resource pool or V2X resource pool) configuration information and the power control configuration information is used for indicating whether to perform power control on transmission resources in the resource pool. Optionally, the transmission resources in the resource pool are used for transmission of at least two types of data among unicast sidelink data, multicast sidelink data, and broadcast sidelink data. Optionally, the transmission resources in the resource pool are for selection and use by multiple terminals after listening. The multiple terminals include terminals using the unicast transmission mode, terminals using the multicast transmission mode, and terminals using the broadcast transmission mode.

In act 604, whether to perform power control when sidelink data is sent is determined according to the power control configuration information.

Exemplarily, the "power control" includes at least one of the following three forms: 1. whether to perform power control according to a sidelink path loss when sidelink data is sent is determined according to the power control configuration information; 2. whether to perform power control according to a downlink path loss when sidelink data is sent is determined according to the power control configuration information; and 3. whether to perform power control on a PSCCH when sidelink data is sent is determined according to the power control configuration information.

To sum up, in the method according to this embodiment, power control configuration information is used for indicating that a first terminal does not need to perform power control, so that a terminal using a resource pool (or resources) does not need to perform power control (i.e., neither performs power control according to a sidelink path loss, nor performs power control according to a downlink path loss) when sending sidelink data, and the first terminal may send sidelink data using a maximum sending power. Therefore, all terminals using a same resource pool do not perform power control, thus avoiding a problem that when a terminal adopting a unicast transmission mode performs power control on a resource, a terminal adopting a broadcast transmission mode determines, when listening, that the resource is available and thus preempts the resource, causing a transmission conflict.

Figure 7:
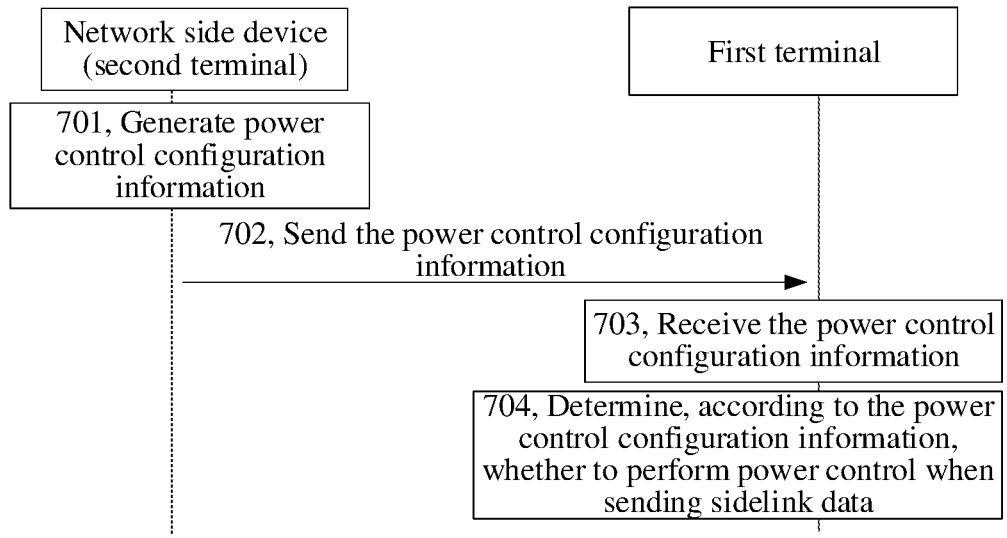
FIG. 7 is a flowchart of a power control method according to an exemplary embodiment of the present application.

FIG. 7 is a flowchart of a power control method according to another exemplary embodiment of the present application. In this embodiment, description is made by taking a case where the method is performed by a first terminal and a network side device (or a second terminal) as an example. The method includes acts 701 to 704.

In act 701, a network side device generates power control configuration information.

The network side device may be an access network device, such as a base station.

In an example, when generating resource pool configuration information, the network side device generates power control configuration information corresponding to the resource pool (or sidelink transmission resource pool or D2D resource pool or V2X resource pool).

In an example, when dynamically scheduling sidelink transmission, the network side device generates power control configuration information corresponding to a dynamically scheduled resource (or sidelink transmission resource or D2D resource or V2X resource).

In an example, when semi-statically scheduling sidelink transmission, the network side device generates power control configuration information corresponding to a semi-statically scheduled resource (or sidelink transmission resource or D2D resource or V2X resource).

In an example, when configuring a sidelink transmission resource through sidelink configuration grant, the network side device generates power control configuration information corresponding to a resource of sidelink configuration grant (or sidelink transmission resource or D2D resource or V2X resource).

In act 702, the network side device sends the power control configuration information.

In an example, the network side device sends broadcast information, and resource pool configuration information is carried in the broadcast information, and power control configuration information is carried in the resource pool configuration information.

In an example, the network side device sends a first Radio Resource Control (RRC) specific signaling, and resource pool configuration information is carried in the first RRC specific signaling, and power control configuration information is carried in the resource pool configuration information. An RRC specific signaling refers to an RRC signaling which usually may be scrambled using a Cell Radio-Network Temporary Identifier (C-RNTI) of the terminal and is sent by the network side device specifically to a current terminal.

In an example, the network side device sends first Downlink Control Information (DCI), and power control configuration information is carried in the first DCI.

The first DCI is used for dynamically allocating a sidelink transmission resource for a first terminal.

In an example, the network side device sends a second RRC specific signaling, and the second RRC specific signaling is used for configuring sidelink configuration grant, and power control configuration information is carried in the second RRC specific signaling.

For example, the SideLink Configuration Grant is a Type-1 Configuration Grant (Type-1 CG).

In an example, the network side device sends a second RRC specific signaling and second DCI, and the second RRC specific signaling is used for configuring sidelink configuration grant, and the second DCI is used for activating or deactivating the sidelink configuration grant, and power control configuration information is carried in the second RRC specific signaling or the second DCI.

For example, the SideLink Configuration Grant is a Type-2 Configuration Grant (Type-2 CG). A transmission resource configured using the Type-2 CG can only be used after being activated using the second DCI.

In act 703, a first terminal receives the power control configuration information.

In an example, the first terminal receives broadcast information sent by the network side device, and resource pool configuration information is carried in the broadcast information, and power control configuration information is carried in the resource pool configuration information.

In an example, the first terminal receives a first RRC specific signaling sent by the network side device, and resource pool configuration information is carried in the first RRC specific signaling, and power control configuration information is carried in the resource pool configuration information.

In an example, the first terminal receives first DCI sent by the network side device, and power control configuration information is carried in the first DCI.

In an example, the first terminal receives a second RRC specific signaling sent by the network side device, and the second RRC specific signaling is used for configuring sidelink configuration grant, and power control configuration information is carried in the second RRC specific signaling.

In an example, the first terminal receives a second RRC specific signaling and second DCI sent by the network side device, the second DCI is used for activating or deactivating sidelink configuration grant, and power control configuration information is carried in the second RRC specific signaling or the second DCI.

In act 704, the first terminal determines, according to the power control configuration information, whether to perform power control when sending sidelink data.

Exemplarily, the "power control" includes at least one of the following three forms: 1. whether to perform power control according to a sidelink path loss when sidelink data is sent is determined according to the power control configuration information; 2. whether to perform power control according to a downlink path loss when sidelink data is sent is determined according to the power control configuration information; and 3. whether to perform power control on a PSCCH when sidelink data is sent is determined according to the power control configuration information.

To sum up, in the method according to this embodiment, power control configuration information is used for indicating that a first terminal does not need to perform power control, so that a terminal using a resource pool (or resources) does not need to perform power control (i.e., neither performs power control according to a sidelink path loss, nor performs power control according to a downlink path loss) when sending sidelink data, and the first terminal may send sidelink data using a maximum sending power.

Therefore, all terminals using a same resource pool do not perform power control, thus avoiding a problem that when a terminal adopting a unicast transmission mode performs power control on a resource, a terminal adopting a broadcast transmission mode determines, when listening, that the resource is available and thus preempts the resource, causing a transmission conflict.

Further, in the present application, the power control configuration information is carried in a RRC specific signaling or DCI, and for a scenario where the terminal independently selects a resource in a resource pool, a scenario of semi-static scheduling, a scenario of dynamic scheduling, etc., a power control function may be enabled or disabled, so that in the three transmission scenarios, all terminals using a same resource pool may not perform power control, thus avoiding a problem that when a terminal adopting a unicast transmission mode performs power control on a resource, a terminal adopting a broadcast transmission mode determines, when listening, that the resource is available and thus preempts the resource, causing a transmission conflict.

It should be noted that the above power control configuration information may also be generated and sent by a second terminal.

The second terminal may be a group head terminal of a communication group where the first terminal is located. The group head terminal is a terminal that has at least one of functions of resource management, resource allocation, resource coordination, and group management within a communication group.

For example, the first terminal, the second terminal and a third terminal constitute a communication group, wherein the second terminal is a group head terminal of the group, and the second terminal may send first configuration information to the first terminal to indicate whether the first terminal needs to perform power control.

The second terminal may also be an opposite terminal (relative to the first terminal) in unicast communication.

For example, the first terminal and the second terminal perform unicast communication, and the first terminal may receive the first configuration information sent by the second terminal, and determine, according to the first configuration information, whether to perform power control.

Optionally, the first configuration information may be carried through a PSCCH or a sidelink RRC signaling.

Figure 8:
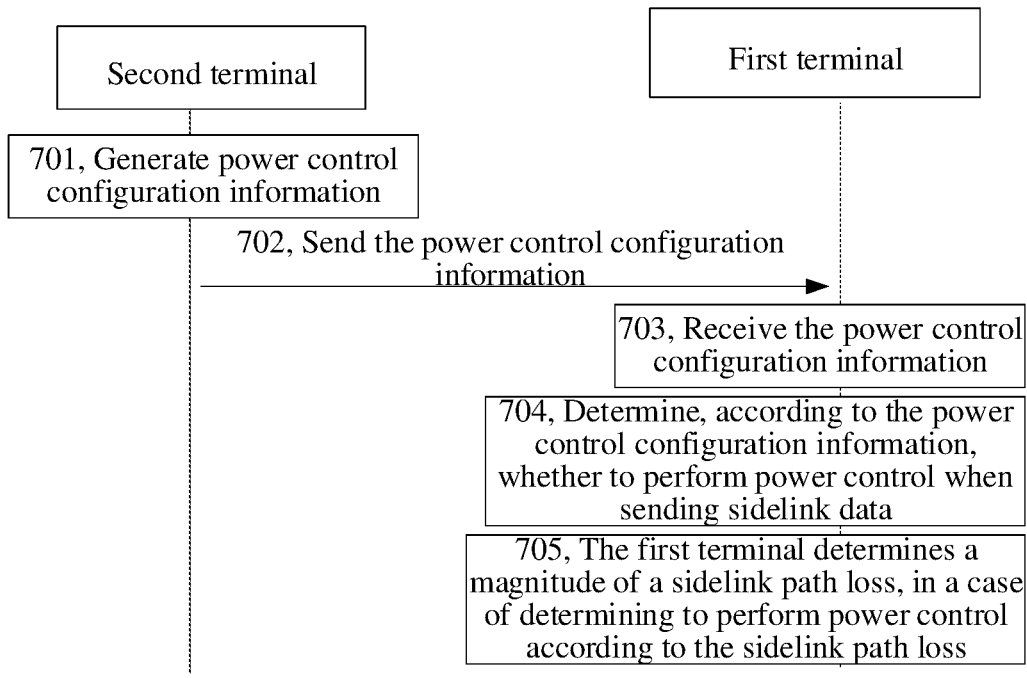
FIG. 8 is a flowchart of a power control method according to an exemplary embodiment of the present application.

In optional embodiments based on FIG. 6 and FIG. 7, act 705 is further included after the act 704, as shown in FIG. 8.

In act 705, the first terminal determines a magnitude of a sidelink path loss, in a case of determining to perform power control according to the sidelink path loss.

Exemplarily, the first terminal determines the magnitude of the sidelink path loss according to a sending power and an RSRP measurement result.

A determining process with respect to the sending power is as follows.

The first terminal determines the sending power according to a first sending power of a PSSCH sent by the first terminal. In an example, the first sending power is a sending power on each Resource Element (RE) of a PSSCH sent by the first terminal.

The first terminal may use a single antenna port for sending, or use multiple antenna ports for sending. When the first terminal uses a single antenna port for sending, the first sending power is a sending power of each RE on the single antenna port. When the first terminal uses N antenna ports for sending, N being an integer greater than 1, the first sending power is a sum of sending powers of each RE on N antenna ports. Taking N being equal to 2 as an example, the first sending power is a sum of sending powers of each RE on two antenna ports. In an example, serial numbers of REs sending a PSSCH on two antenna ports are $RE_1^0$ to $RE_{100}^0$ (corresponding to antenna port 0) and $RE_1^1$ to $RE_{100}^0$ (corresponding to antenna port 1) respectively. Sending powers of $RE_1^0$ and $RE_1^1$ sending the PSSCH on the two antenna ports are added to obtain a sending power of $RE_1$, sending powers of $RE_2^0$ and $RE_2^1$ sending the PSSCH on the two antenna ports are added to obtain a sending power of $RE_2$, and so on. The first sending power is a sending power on the $RE_1$, or a sending power on the $RE_2$, or a sending power on an RE carrying a PSSCH Demodulation Reference Signal (DMRS), or a sending power on any RE sending a PSSCH. When the first terminal sends a PSSCH, there is no power boosting on an RE where a DMRS is located, i.e., all REs carrying PSSCH data and REs carrying PSSCH DMRSs have a same power. Therefore, the first sending power may be determined by dividing a sending power of the first terminal by a total number (i.e., a sum of REs occupied by PSSCH data and REs occupied by PSSCH DMRSs) of REs occupied by the PSSCH on one Orthogonal Frequency-Division Multiplexing (OFDM) symbol.

Optionally, the PSSCH is a PSSCH already sent on the first terminal. When the first terminal calculates a sidelink path loss, a sending power of the PSSCH needs to be used, and since the PSSCH is a PSSCH already sent by the first terminal, the sending power of the PSSCH may be determined according to a sending power used by the first terminal when sending the PSSCH.

In another possible implementation mode, when the first terminal uses N antenna ports for sending, N being an integer greater than 1, the first sending power is N times that of a first antenna port among the N antenna ports. The first antenna port is any one of the N antenna ports, or the first antenna port is a designated one of the N antenna ports.

A determining process with respect to an RSRP measurement result is as follows.

The RSRP measurement result is obtained through measurement according to a Physical SideLink Shared Channel Demodulation Reference Signal (PSSCH DMRS) and/or a Physical SideLink Control Channel Demodulation Reference Signal (PSCCH DMRS) sent by the first terminal.

Exemplarily, the first terminal receives an RSRP measurement result sent by the second terminal, and the RSRP measurement result is obtained through measurement by the second terminal according to a PSSCH DMRS or a PSCCH DMRS sent by the first terminal. After obtaining the RSRP measurement result through measurement by the second terminal according to the PSSCH DMRS or the PSCCH DMRS sent by the first terminal, the second terminal sends the RSRP measurement result to the first terminal.

The first terminal may use a single antenna port for sending, or use multiple antenna ports for sending. When the first terminal uses a single antenna port for sending, the RSRP measurement result is an RSRP measurement result of the single antenna port. When the first terminal uses M antenna ports for sending, M being an integer greater than 1, the RSRP measurement result is a sum of RSRP measurement results of M antenna ports. Take M being equal to 2 as an example, the RSRP measurement result is a sum of RSRP measurement results on two antenna ports.

In another possible implementation mode, when the first terminal uses M antenna ports for sending, M being an integer greater than 1, the RSRP measurement result is M times that of a first antenna port among the M antenna ports.

The first antenna port is any one of the M antenna ports, or the first antenna port is a designated one of the M antenna ports.

Figure 9:
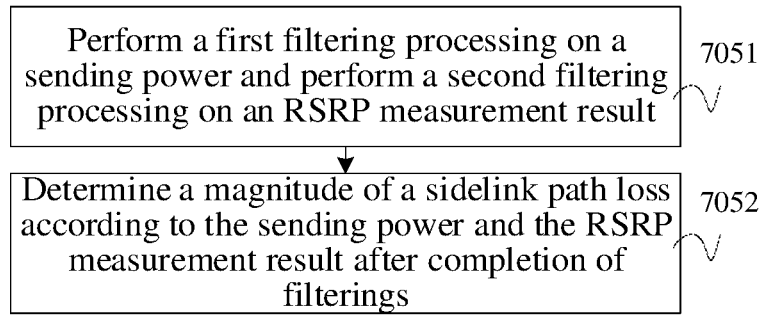
FIG. 9 is a flowchart of a power control method according to an exemplary embodiment of the present application.

In an optional embodiment based on FIG. 8, act 705 includes act 7051 and act 7052, as shown in FIG. 9.

In act 7051, a first filtering processing is performed on a sending power, and a second filtering processing is performed on a Reference Signal Received Power (RSRP) measurement result.

Optionally, the second terminal performs RSRP measurement according to a PSSCH DMRS sent by the first terminal, performs a second filtering processing on an RSRP measurement result, and feeds back the RSRP measurement result after the second filtering processing to the first terminal.

Optionally, the first terminal sends a PSSCH, performs a first filtering processing on a sending power on an RE carrying a PSSCH DMRS, and calculates a sidelink path loss according to the sending power after the first filtering processing.

Optionally, a same filtering coefficient is used for the first filtering processing and the second filtering processing.

In act 7052, a magnitude of a sidelink path loss is determined according to the sending power and the RSRP measurement result.

In an example, the first terminal calculates the magnitude of the sidelink path loss according to the following formula.

$$PL_{SL} = \text{referenceSignalPower} - \text{higher layer filtered RSRP}$$

In the above formula, referenceSignalPower is obtained according to a PSSCH transmission power of each RE of the first terminal. Optionally, this parameter is obtained by performing higher-layer filtering on a PSSCH transmission opportunity using a first filtering coefficient. Exemplarily, the referenceSignalPower is calculated for an RE of each reference signal. When the first terminal sends a PSSCH, an RE carrying data and an RE carrying a DMRS have a same power. Therefore, for a single antenna port, a power on each RE is calculated (or a power on each DMRS RE is calculated), which is the referenceSignalPower. Optionally, the first terminal may divide the sending power by a quantity of REs occupied by a PSSCH channel on each Orthogonal Frequency-Division Multiplexing (OFDM) symbol, thus determining a sending power on each RE, i.e., a power on each PSSCH DMRS RE.

Higher layer filtered RSRP is an RSRP after higher-layer filtering, and the RSRP is obtained through measurement according to a PSSCH DMRS or a PSCCH DMRS. This parameter is reported to the first terminal from the second terminal receiving PSCCH/PSSCH transmission. Optionally, the second terminal uses a first filter coefficient to perform higher-layer filtering on an RSRP measurement and reports a filtered RSRP to the first terminal.

That is, the sending power and the RSRP measurement result are obtained by performing higher-layer filtering according to a same filter configuration.

To sum up, in the method according to this embodiment, by determining the magnitude of the sidelink path loss by the first terminal, power control may be reasonably performed when sidelink data is sent, communication interference may be reduced and communication efficiency may be improved.

In the method according to this embodiment, for each RE, powers of multiple antenna ports are added to calculate a total power of the RE, and a sidelink path loss is calculated according to the total power, which improves calculation accuracy of the sidelink path loss.

Figure 10:
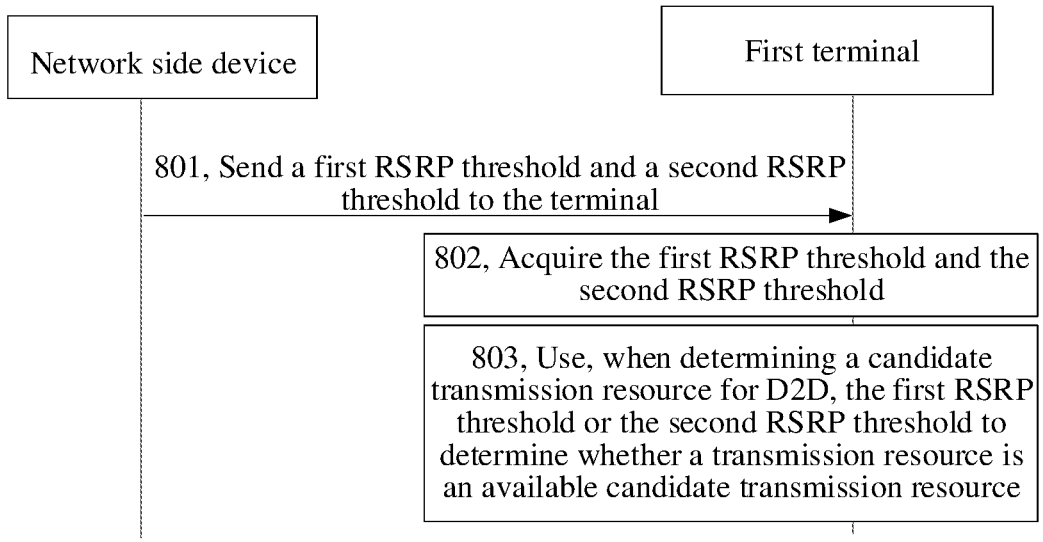
FIG. 10 is a flowchart of a method for determining a transmission resource according to an exemplary embodiment of the present application.

FIG. 10 is a flowchart of a method for determining a transmission resource according to an exemplary embodiment of the present application. In this embodiment, description is made by taking a case where the method is performed by a terminal and a network side device as an example. The method includes act 801 to act 803.

In act 801, a network side device sends a first RSRP threshold and a second RSRP threshold to a terminal.

Optionally, the first RSRP threshold is smaller than the second RSRP threshold.

Optionally, the network side device sends the first RSRP threshold and the second RSRP threshold to the terminal through a downlink.

In act 802, the terminal acquires the first RSRP threshold and the second RSRP threshold.

In act 803, when determining a candidate transmission resource for Device to Device (D2D), the terminal uses the first RSRP threshold or the second RSRP threshold to determine whether a transmission resource is an available candidate transmission resource.

Optionally, if sidelink data transmitted on the candidate transmission resource is transmitted in unicast, and/or supports power control, the terminal uses the first RSRP threshold to determine whether the transmission resource is an available candidate transmission resource. Otherwise, the second RSRP threshold is used for determining whether the transmission resource is an available candidate transmission resource.

For example, in a scenario where sidelink data is transmitted in unicast or supports power control, if the terminal detects scheduling information on a PSCCH when performing resource listening, it will measure a PSSCH-RSRP on a transmission resource of a PSSCH scheduled through the scheduling information and compare the PSSCH-RSRP with the first RSRP threshold. If the measured PSSCH-RSRP is lower than the first RSRP threshold, the transmission resource is considered to be an available candidate transmission resource; and if the measured PSSCH-RSRP is higher than the first RSRP threshold, the transmission resource is considered to be unavailable and is excluded from candidate transmission resources.

In another example, in a scenario where sidelink data uses multicast transmission, broadcast transmission, or does not support power control, if the terminal detects scheduling information on a PSCCH when performing resource listening, it will measure a PSSCH-RSRP on a transmission resource of a PSSCH scheduled through the scheduling information and compare the PSSCH-RSRP with the second RSRP threshold. If the measured PSSCH-RSRP is lower than the second RSRP threshold, the transmission resource is considered to be an available candidate transmission resource; and if the measured PSSCH-RSRP is higher than the second RSRP threshold, the transmission resource is considered to be unavailable and is excluded from candidate transmission resources.

Optionally, the terminal may determine, through indication information carried in a PSCCH, which of unicast, multicast, and broadcast is a transmission mode used for current sidelink data. Specifically, any of following implementation modes may be included.

1. Indication information is carried in SideLink Control Information (SCI) for distinguishing transmission types.
2. Destination identification information is carried in SCI for distinguishing transmission types.

To sum up, in the method according to this embodiment, by configuring a first RSRP threshold and a second RSRP threshold which are different, the terminal may configure, when listening to a resource, a lower RSRP threshold for unicast transmission or transmission that supports power control, so that when listening to a resource, the terminal may avoid preempting a transmission resource of unicast transmission, thereby avoiding interfering with unicast transmission.

In an optional embodiment based on FIG. 10, the first RSRP threshold is for use by a terminal when sidelink data transmitted on a candidate transmission resource is transmitted in unicast. That is, if the sidelink data transmitted on the candidate transmission resource is transmitted in unicast, the terminal uses the first RSRP threshold to determine whether a transmission resource is an available candidate transmission resource; otherwise, the terminal uses the second RSRP threshold to determine whether a transmission resource is an available candidate transmission resource.

In an optional embodiment based on FIG. 10, the first RSRP threshold is for use by a terminal when power control is performed on sidelink data transmitted on a candidate transmission resource. That is, if power control is performed on the sidelink data transmitted on the candidate transmission resource, the terminal uses the first RSRP threshold to determine whether a transmission resource is an available candidate transmission resource; otherwise, the terminal uses the second RSRP threshold to determine whether a transmission resource is an available candidate transmission resource.

In an optional embodiment based on FIG. 10, the first RSRP threshold is for use by a terminal when sidelink data transmitted on a candidate transmission resource is transmitted in unicast and a priority is higher than a priority threshold. That is, if the sidelink data transmitted on the candidate transmission resource is transmitted in unicast and the priority is higher than the priority threshold, the terminal uses the first RSRP threshold to determine whether a transmission resource is an available candidate transmission resource; otherwise, the terminal uses the second RSRP threshold to determine whether a transmission resource is an available candidate transmission resource.

The priority is a first priority carried in a sidelink control channel corresponding to the sidelink data or a second priority corresponding to the sidelink data to be transmitted. The priority threshold may be configured by a network side device, or may be preconfigured or predefined. It should be understood that a higher level of the priority carried in the sidelink control channel indicates a lower priority of corresponding sidelink data; and a lower level of the priority indicates a higher priority of corresponding sidelink data.

In an optional embodiment based on FIG. 10, the first RSRP threshold is for use by a terminal when power control is performed on sidelink data transmitted on a candidate transmission resource and a priority is higher than a priority threshold. That is, if power control is performed on the sidelink data transmitted on the candidate transmission resource and the priority is higher than the priority threshold, the terminal uses the first RSRP threshold to determine whether a transmission resource is an available candidate transmission resource; otherwise, the terminal uses the second RSRP threshold to determine whether a transmission resource is an available candidate transmission resource.

The priority is a first priority carried in a sidelink control channel corresponding to the sidelink data or a second priority corresponding to the sidelink data to be transmitted. The priority threshold may be configured by a network side device, or may be preconfigured or predefined.

It should be noted that in the above examples, the number of the first RSRP thresholds and the number of the second RSRP thresholds are both one for illustration.

In another example, there are at least two first RSRP thresholds, and each first RSRP threshold corresponds to a different priority pair, i.e., different priority pairs may correspond to multiple first RSRP thresholds which may be the same or different. When listening to a resource, the first terminal determines a currently used first RSRP among at least two first RSRP thresholds according to a first priority pair. That is, a first RSRP threshold is determined according to a first priority pair.

In another example, there are at least two second RSRP thresholds, and each second RSRP threshold corresponds to a different priority pair, i.e., different priority pairs may correspond to multiple second RSRP thresholds which may be the same or different. When listening to a resource, the first terminal determines a currently used second RSRP among at least two second RSRP thresholds according to a second priority pair. That is, a second RSRP threshold is determined according to a second priority pair.

A priority pair (e.g., a first priority pair or a second priority pair) includes a first priority and a second priority, the first priority is a priority carried in a sidelink control channel, and the second priority is a priority corresponding to sidelink data to be transmitted.

It should be noted that the acts performed by a single terminal in the above embodiment may be independently implemented as a power control method of a terminal side, and the acts performed by the network side device in the above embodiment may be independently implemented as a power control method of the network side device.

Figure 11:
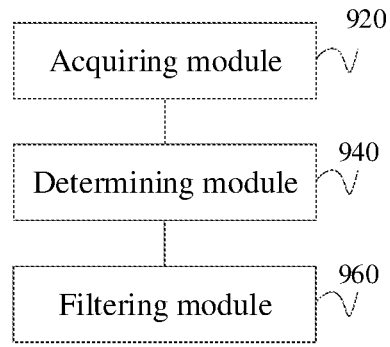
FIG. 11 is a block diagram of a power control apparatus according to an exemplary embodiment of the present application.

FIG. 11 is a block diagram of a power control apparatus according to an exemplary embodiment of the present application. The apparatus may be implemented as a part of a first terminal. The apparatus includes an acquiring module 920 and a determining module 940.

The acquiring module 920 is configured to acquire power control configuration information.

The determining module 940 is configured to determine, according to the power control configuration information, whether to perform power control when sidelink data is sent.

In an optional embodiment, the acquiring module 920 is configured to acquire preconfigured power control configuration information; or the acquiring module 920 is configured to receive the power control configuration information sent by a network side device; or the acquiring module 920 is configured to receive the power control configuration information sent by a second terminal.

In an optional embodiment, the acquiring module 920 is configured to receive broadcast information sent by a network side device, resource pool configuration information is carried in the broadcast information, and the power control configuration information is carried in the resource pool configuration information; or, the acquiring module 920 is configured to receive a first Radio Resource Control (RRC) specific signaling sent by a network side device, resource pool configuration information is carried in the first RRC specific signaling and the power control configuration information is carried in the resource pool configuration information; or the acquiring module 920 is configured to receive first Downlink Control Information (DCI) sent by a network side device, the power control configuration information is carried in the first DCI.

In an optional embodiment, the acquiring module 920 is configured to receive a second RRC specific signaling sent by a network side device, the second RRC specific signaling being used for configuring sidelink configuration grant, and the power control configuration information is carried in the second RRC specific signaling; or the acquiring module 920 is configured to receive the second RRC specific signaling and second DCI sent by the network side device, the second DCI being used for activating or deactivating the sidelink configuration grant, and the power control configuration information is carried in the second RRC specific signaling or the second DCI.

In an optional embodiment, the second terminal is a group head terminal of a communication group where the first terminal is located; or the second terminal is an opposite terminal in unicast communication.

In an optional embodiment, the power control configuration information is carried in a Sidelink Control Channel (PSCCH) or a sidelink RRC signaling.

In an optional embodiment, the determining module 940 is configured to determine, according to the power control configuration information, whether to perform power control according to a sidelink path loss when the sidelink data is sent; and/or, the determining module 940 is configured to determine, according to the power control configuration information, whether to perform power control according to a downlink path loss when the sidelink data is sent; and/or, the determining module 940 is configured to determine, according to the power control configuration information, whether to perform power control on a Sidelink Control Channel (PSCCH) when the sidelink data is sent.

In an optional embodiment, the determining module 940 is further configured to determine a magnitude of the sidelink path loss in a case of performing power control according to the sidelink path loss.

In an optional embodiment, the determining module 940 is further configured to determine a magnitude of the sidelink path loss according to a sending power and a Reference Signal Received Power (RSRP) measurement result.

In an optional embodiment, the determining module 940 is further configured to determine the sending power according to a first sending power of a PSSCH transmitted by the apparatus.

In an optional embodiment, the first sending power includes a sending power on each resource element of the PSSCH transmitted by the apparatus.

In an optional embodiment, the apparatus uses a single antenna port for sending, and the first sending power is a sending power of the single antenna port.

In an optional embodiment, the apparatus uses N antenna ports for sending, N being an integer greater than 1; and the first sending power is a sum of sending powers of the N antenna ports. Or, the first sending power is N times a sending power of a first antenna port among the N antenna ports, and the first antenna port is any one of the N antenna ports.

In an optional embodiment, the RSRP measurement result is obtained through measurement according to a PSSCH DMRS and/or a PSCCH DMRS sent by the first terminal.

In an optional embodiment, the acquiring module 920 is further configured to receive the RSRP measurement result sent by the second terminal, and the RSRP measurement result is obtained through measurement by the second terminal according to the PSSCH DMRS or the PSCCH DMRS sent by the apparatus.

In an optional embodiment, the apparatus uses a single antenna port for sending, and the RSRP measurement result is an RSRP measurement result of the single antenna port.

In an optional embodiment, the apparatus uses M antenna ports for sending, M being an integer greater than 1; the RSRP measurement result is a sum of RSRP measurement results of the M antenna ports. Or, the RSRP measurement result is M times an RSRP measurement result of a first antenna port among the M antenna ports.

In an optional embodiment, the apparatus further includes a filtering module 960.

The filtering module 960 is configured to perform a first filtering processing on the sending power and a second filtering processing on the RSRP measurement result.

In an optional embodiment, the filtering module 960 is further configured to use a same filtering coefficient to perform the first filtering processing and the second filtering processing.

Figure 12:
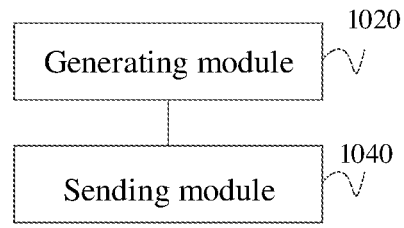
FIG. 12 is a block diagram of a power control apparatus according to an exemplary embodiment of the present application.

FIG. 12 is a block diagram of a power control apparatus according to an exemplary embodiment of the present application. The apparatus may be implemented as a part of a network side device or a second terminal. The apparatus includes a generating module 1020 and a sending module 1040.

The generating module 1020 is configured to generate power control configuration information, the power control configuration information being used for indicating whether a first terminal performs power control when sidelink data is sent.

The sending module 1040 is configured to send the power control configuration information.

In an optional embodiment, the apparatus is applied to a network side device, the sending module 1040 is configured to send broadcast information, resource pool configuration information is carried in the broadcast information, and the power control configuration information is carried in the resource pool configuration information; or the sending module 1040 is configured to send a first Radio Resource Control (RRC) specific signaling, resource pool configuration information is carried in the first RRC specific signaling, and the power control configuration information is carried in the resource pool configuration information; or the sending module 1040 is configured to send first Downlink Control Information (DCI), the power control configuration information is carried in the first DCI.

In an optional embodiment, the apparatus is applied to a network side device, the sending module 1040 is configured to send a second RRC specific signaling, the second RRC specific signaling being used for configuring sidelink configuration grant, and the power control configuration information is carried in the second RRC specific signaling; or the sending module 1040 is configured to send the second RRC specific signaling and second DCI, the second DCI being used for activating or deactivating the sidelink configuration grant, and the power control configuration information is carried in the second RRC specific signaling or the second DCI.

In an optional embodiment, the apparatus is applied to a second terminal; the second terminal is a group head terminal of a communication group where the first terminal is located; or the second terminal is an opposite terminal in unicast communication.

In an optional embodiment, the power control configuration information is carried in a Sidelink Control Channel (PSCCH) or a sidelink RRC signaling.

In an optional embodiment, the power control configuration information is used for indicating whether the first terminal performs power control according to a sidelink path loss when the sidelink data is sent; and/or the power control configuration information is used for indicating whether the first terminal performs power control according to a downlink path loss when the sidelink data is sent; and/or the power control configuration information is used for indicating whether the first terminal performs power control on a Sidelink Control Channel (PSCCH) when the sidelink data is sent.

Figure 13:
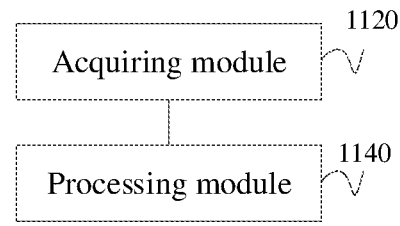
FIG. 13 is a block diagram of a power control apparatus according to an exemplary embodiment of the present application.

FIG. 13 is a block diagram of an apparatus for determining a transmission resource according to an exemplary embodiment of the present application. The apparatus may be implemented as a part of a first terminal, and the apparatus includes an acquiring module 1120 and a processing module 1140.

The acquiring module 1120 is configured to acquire a first Reference Signal Received Power (RSRP) threshold and a second RSRP threshold.

The processing module 1140 is configured to use, when determining a candidate transmission resource for D2D, the first RSRP threshold or the second RSRP threshold to determine whether the transmission resource is an available candidate transmission resource.

In an optional embodiment, the processing module 1140 is configured to use the first RSRP threshold to determine whether the transmission resource is an available candidate transmission resource if sidelink data transmitted on a candidate transmission resource is transmitted in unicast; otherwise, use the second RSRP threshold to determine whether the transmission resource is an available candidate transmission resource; or the processing module 1140 is configured to use the first RSRP threshold to determine whether the transmission resource is an available candidate transmission resource if power control is performed on sidelink data transmitted on a candidate transmission resource; otherwise, use the second RSRP threshold to determine whether the transmission resource is an available candidate transmission resource.

In an optional embodiment, the processing module 1140 is configured to use the first RSRP threshold to determine whether the transmission resource is an available candidate transmission resource if sidelink data transmitted on a candidate transmission resource is transmitted in unicast and a priority is higher than a priority threshold; otherwise, use the second RSRP threshold to determine whether the transmission resource is an available candidate transmission resource; or the processing module 1140 is configured to use the first RSRP threshold to determine whether the transmission resource is an available candidate transmission resource if power control is performed on sidelink data transmitted on a candidate transmission resource and a priority is higher than the priority threshold; otherwise, use the second RSRP threshold to determine whether the transmission resource is an available candidate transmission resource.

The priority is a first priority carried in a sidelink control channel corresponding to the sidelink data or a second priority corresponding to the sidelink data to be transmitted.

In an optional embodiment, the first RSRP threshold is determined according to a first priority pair, and the second RSRP threshold is determined according to a second priority pair; wherein the first priority pair or the second priority pair includes a first priority and a second priority, the first priority is a priority carried in a sidelink control channel, and the second priority is a priority corresponding to sidelink data to be transmitted.

Figure 14:
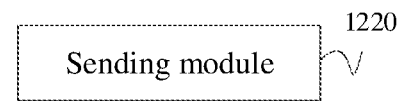
FIG. 14 is a block diagram of an apparatus for determining a transmission resource according to an exemplary embodiment of the present application.

FIG. 14 is a block diagram of an apparatus for determining a transmission resource according to an exemplary embodiment of the present application. The apparatus may be implemented as a part of a network side device. The apparatus includes a sending module 1220.

The sending module 1220 is configured to send a first Reference Signal Received Power (RSRP) threshold and a second RSRP threshold to a terminal, the terminal being configured to use, when determining a candidate transmission resource for D2D, the first RSRP threshold or the second RSRP threshold to determine whether the transmission resource is an available candidate transmission resource.

In an optional embodiment, the first RSRP threshold is for use by the terminal when sidelink data transmitted on a candidate transmission resource is transmitted in unicast; or the first RSRP threshold is for use by the terminal when power control is performed on sidelink data transmitted on a candidate transmission resource.

In an optional embodiment, the first RSRP threshold is for use by the terminal when sidelink data transmitted on a candidate transmission resource is transmitted in unicast and a priority is higher than a priority threshold; or the first RSRP threshold is for use by the terminal when power control is performed on sidelink data transmitted on a candidate transmission resource and a priority is higher than the priority threshold; wherein the priority is a first priority carried in a sidelink control channel corresponding to the sidelink data or a second priority corresponding to the sidelink data to be transmitted.

In an optional embodiment, there are at least two first RSRP thresholds, and each first RSRP threshold corresponds to a different priority pair; and/or there are at least two second RSRP thresholds, and each second RSRP threshold corresponds to a different priority pair; wherein the priority pair includes a first priority and a second priority, the first priority is a priority carried in a sidelink control channel, and the second priority is a priority corresponding to sidelink data to be transmitted.

Figure 15:
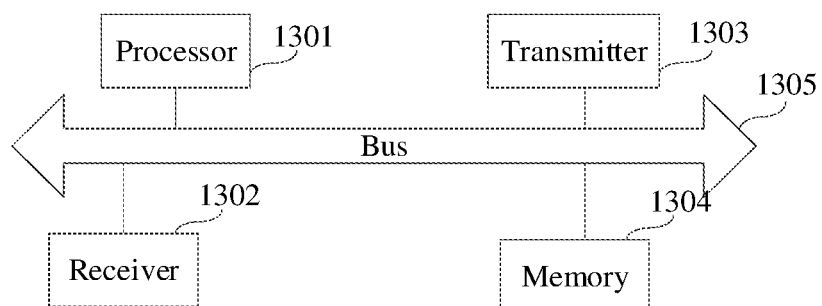
FIG. 15 is a block diagram of a terminal according to an exemplary embodiment of the present application.

FIG. 15 is a schematic diagram of a structure of a terminal according to an exemplary embodiment of the present application. The terminal includes a processor 1301, a receiver 1302, a transmitter 1303, a memory 1304, and a bus 1305.

The processor 1301 includes one or more processing cores. The processor 1301 performs various functional applications and information processing by running software programs and modules.

The receiver 1302 and the transmitter 1303 may be implemented as a communication assembly, which may be a communication chip.

The memory 1304 is connected to the processor 1301 via the bus 1305.

The memory 1304 may be configured to store at least one instruction, and the processor 1301 is configured to execute the at least one instruction to implement various acts in the above method embodiments.

In addition, the memory 1304 may be implemented by any type of transitory or non-transitory storage device or a combination thereof. The transitory or non-transitory storage device includes, but is not limited to, a magnetic disk or an optical disk, an Electrically Erasable Programmable Read Only Memory (EEPROM), an Erasable Programmable Read Only Memory (EPROM), a Static Random Access Memory (SRAM), a Read Only Memory (ROM), a magnetic memory, a flash memory, and a Programmable Read Only Memory (PROM).

In an exemplary embodiment, a computer-readable storage medium is also provided, which stores at least one instruction, at least one program, a code set, or an instruction set, the at least one instruction, the at least one program, the code set, or the instruction set being loaded and executed by the processor to implement the power control method or the method for determining a transmission resource performed by a terminal according to the above various method embodiments.

Figure 16:
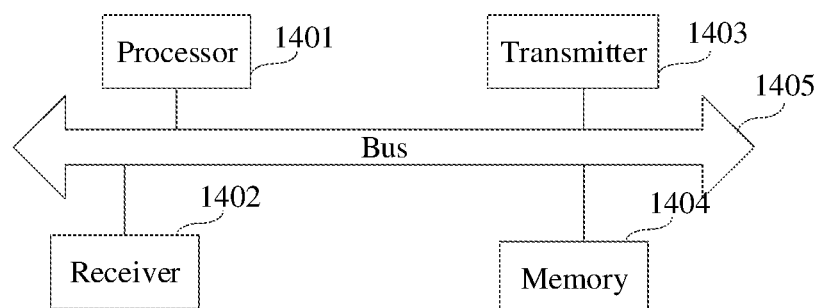
FIG. 16 is a block diagram of a network side device according to an exemplary embodiment of the present application.

FIG. 16 is a schematic diagram of a structure of a network side device according to an exemplary embodiment of the present application. The network side device includes a processor 1401, a receiver 1402, a transmitter 1403, a memory 1404, and a bus 1405.

The processor 1401 includes one or more processing cores. The processor 1401 performs various functional applications and information processing by running software programs and modules.

The receiver 1402 and the transmitter 1403 may be implemented as a communication assembly, which may be a communication chip.

The memory 1404 is connected to the processor 1401 via the bus 1405.

The memory 1404 may be configured to store at least one instruction, and the processor 1401 is configured to execute the at least one instruction to implement various acts in the above method embodiments.

In addition, the memory 1404 may be implemented by any type of transitory or non-transitory storage device or a combination thereof. The transitory or non-transitory storage device includes, but is not limited to, a magnetic disk or an optical disk, an Electrically Erasable Programmable Read Only Memory (EEPROM), an Erasable Programmable Read Only Memory (EPROM), a Static Random Access Memory (SRAM), a Read Only Memory (ROM), a magnetic memory, a flash memory, and a Programmable Read Only Memory (PROM).

In an exemplary embodiment, a computer-readable storage medium is also provided, which stores at least one instruction, at least one program, a code set, or an instruction set, the at least one instruction, the at least one program, the code set, or the instruction set being loaded and executed by the processor to implement the power control method or the method for determining a transmission resource performed by a network side device according to the above various method embodiments.

One of ordinary skills in the art may understand that all or part of the acts for implementing the embodiments may be completed through hardware, or may be completed by instructing related hardware through programs, the programs may be stored in a computer-readable storage medium, the above-mentioned storage medium may be a read only memory, a magnetic disk, or an optical disk, etc.

The above are only optional embodiments of the present application, which are not intended to limit the present application. Any modification, equivalent substitution, improvement, etc., made within the spirit and principles of the present application shall be included in the protection scope of the present application.

The invention claimed is:

1. A power control method, comprising:
   acquiring, by a first terminal, power control configuration information; and
   determining, by the first terminal and according to the power control configuration information, whether to perform power control when sending sidelink data,
   wherein determining according to the power control configuration information, whether to perform power control when sending sidelink data comprises:
   determining according to the power control configuration information, whether to perform power control according to a sidelink path loss when sending the sidelink data;
   determining according to the power control configuration information, whether to perform the power control according to a downlink path loss when sending the sidelink data; and
   determining, according to the power control configuration information, whether to perform power control on a Physical Sidelink Control Channel (PSCCH) when sending the sidelink data;
   wherein in a case of determining to perform power control according to the sidelink path loss,
   the method further comprises:
   determining a magnitude of the sidelink path loss;
   wherein the determining the magnitude of the sidelink path loss comprises:
   determining the magnitude of the sidelink path loss according to a sending power and a Reference Signal Received Power (RSRP) measurement result,
   wherein the method further comprises:
   determining the sending power according to a first sending power of a Physical Sidelink Shared Channel (PSSCH) sent by the first terminal,
   wherein the first terminal uses N antenna ports for sending, N being an integer greater than 1,
   the first sending power is a sum of sending powers of the N antenna ports, and the RSRP measurement result is a sum of RSRP measurement results of the N antenna ports;
   the method further comprises:
   receiving, by the first terminal, the RSRP measurement result sent by a second terminal, wherein the RSRP measurement result is obtained through measurement by the second terminal according to a Physical SideLink Shared Channel Demodulation Reference Signal (PSSCH DMRS) and/or a Physical SideLink Control Channel Demodulation Reference Signal (PSCCH DMRS) sent by the first terminal;
   wherein in a case of determining to perform the power control according to both the sidelink path loss and the downlink path loss when sending the sidelink data, the method further comprises:
   determining a magnitude of the sidelink path loss; and
   determining a magnitude of the downlink path loss.

2. The method according to claim 1, wherein the acquiring the power control configuration information comprises:
   acquiring the power control configuration information that is preconfigured;
   or,
   receiving the power control configuration information sent by a network side device.

3. The method according to claim 2, wherein the receiving the power control configuration information sent by the network side device comprises:
   receiving a first Radio Resource Control (RRC) specific signaling sent by the network side device, resource pool configuration information being carried in the first RRC specific signaling, and the power control configuration information being carried in the resource pool configuration information.

4. The method according to claim 1, wherein the method further comprises:
   performing a first filtering processing on the sending power and a second filtering processing on the RSRP measurement result;
   wherein the method further comprises:
   performing the first filtering processing and the second filtering processing using a same filtering coefficient.

5. A power control apparatus, comprising:
a processor configured to acquire power control configuration information;
wherein the processor is further configured to determine, according to the power control configuration information, whether to perform power control when sidelink data is sent;
wherein the processor is further configured to determine, according to the power control configuration information, whether to perform power control according to a sidelink path loss when the sidelink data is sent, determine, according to the power control configuration information, whether to perform the power control according to a downlink path loss when the sidelink data is sent; and determine, according to the power control configuration information, whether to perform power control on a Physical Sidelink Control Channel (PSCCH) when the sidelink data is sent;
wherein the processor is further configured to determine a magnitude of the sidelink path loss in a case of performing power control according to the sidelink path loss;
wherein the processor is further configured to determine the magnitude of the sidelink path loss according to a sending power and a Reference Signal Received Power (RSRP) measurement result;
wherein the processor is further configured to determine the sending power according to a first sending power of a Physical Sidelink Shared Channel (PSSCH) sent by the apparatus,
wherein the apparatus uses N antenna ports for sending, N being an integer greater than 1,
the first sending power is a sum of sending powers of the N antenna ports, and the RSRP measurement result is a sum of RSRP measurement results of the N antenna ports;
wherein the apparatus further comprises a receiver, the receiver is configured to receive the RSRP measurement result sent by a second terminal; the RSRP measurement result is obtained through measurement by the second terminal according to a Physical SideLink Shared Channel Demodulation Reference Signal (PSSCH DMRS) and/or a Physical SideLink Control Channel Demodulation Reference Signal (PSCCH DMRS) sent by the apparatus;
wherein the processor is further configured to determine a magnitude of the sidelink path loss and a magnitude of the downlink path loss in a case of performing the power control according to both the sidelink path loss and the downlink path loss when the sidelink data is sent.

6. The apparatus according to claim 5, wherein
the processor is configured to acquire the power control configuration information that is preconfigured; or,
the processor is configured to acquire, through the receiver, the power control configuration information sent by a network side device.

7. The apparatus according to claim 6, wherein
the receiver is configured to receive a first Radio Resource Control (RRC) specific signaling sent by the network side device, resource pool configuration information being carried in the first RRC specific signaling and the power control configuration information being carried in the resource pool configuration information.

8. A power control apparatus, comprising:
a processor configured to generate power control configuration information, the power control configuration information being used for indicating whether a first terminal performs power control when sidelink data is sent; and
a transmitter configured to send the power control configuration information,
wherein the power control configuration information being used for indicating whether a first terminal performs power control according to a sidelink path loss when the sidelink data is sent, whether the first terminal performs the power control according to a downlink path loss when the sidelink data is sent; and whether the first terminal performs power control on a Physical Sidelink Control Channel (PSCCH) when the sidelink data is sent;
wherein in a case that the first terminal performs power control according to a sidelink path loss when the sidelink data is sent, the first terminal determines a magnitude of the sidelink path loss according to a sending power and a Reference Signal Received Power (RSRP) measurement result; and the first terminal determines the sending power according to a first sending power of a Physical Sidelink Shared Channel (PSSCH) sent by the first terminal, the first terminal uses N antenna ports for sending, N being an integer greater than 1, the first sending power is a sum of sending powers of the N antenna ports, and the RSRP measurement result is a sum of RSRP measurement results of the N antenna ports;
the transmitter is further configured to send the RSRP measurement result; wherein the RSRP measurement result is obtained through measurement by the apparatus according to a Physical SideLink Shared Channel Demodulation Reference Signal (PSSCH DMRS) and/or a Physical SideLink Control Channel Demodulation Reference Signal (PSCCH DMRS) sent by the first terminal;
wherein in a case that the first terminal performs the power control according to both the sidelink path loss and the downlink path loss when the sidelink data is sent, the first terminal determines a magnitude of the sidelink path loss and a magnitude of the downlink path loss.

* * * * *